US011080685B1

(12) United States Patent
Maeng

(10) Patent No.: US 11,080,685 B1
(45) Date of Patent: Aug. 3, 2021

(54) DIRECT PAYMENT AUTHORIZATION PATH

(71) Applicant: Wells Fargo Bank, N.A., San Francisco, CA (US)

(72) Inventor: Joon Maeng, Newcastle, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 262 days.

(21) Appl. No.: 15/620,562

(22) Filed: Jun. 12, 2017

(51) Int. Cl.
*G06Q 20/36* (2012.01)
*G06Q 20/40* (2012.01)
*G06Q 20/20* (2012.01)
*G06Q 20/38* (2012.01)

(52) U.S. Cl.
CPC .......... *G06Q 20/36* (2013.01); *G06Q 20/202* (2013.01); *G06Q 20/3829* (2013.01); *G06Q 20/405* (2013.01)

(58) Field of Classification Search
CPC .............................................. G06Q 20/00–425
See application file for complete search history.

(56) References Cited

U.S. PATENT DOCUMENTS

| | | | |
|---|---|---|---|
| 6,327,578 B1 * | 12/2001 | Linehan | G06Q 20/02 705/65 |
| 6,601,037 B1 | 7/2003 | Kolls | |
| 7,377,427 B2 | 5/2008 | Murata | |
| 8,190,521 B2 | 5/2012 | O'Leary et al. | |
| 2010/0125510 A1 * | 5/2010 | Smith | G06Q 20/105 705/17 |
| 2011/0166921 A1 * | 7/2011 | Degraeve | G06Q 10/107 705/14.23 |
| 2013/0054465 A1 * | 2/2013 | Sakata | G06Q 30/04 705/44 |
| 2014/0074605 A1 * | 3/2014 | Sanchez | G06Q 30/0267 705/14.53 |
| 2014/0279117 A1 | 9/2014 | Choi et al. | |
| 2015/0332264 A1 * | 11/2015 | Bondesen | G06Q 20/405 705/44 |

OTHER PUBLICATIONS

Ron White, How Computers Work, 7th Edition (Year: 2003).*
Horton et al., Primer on Payment Security Technologies, (Year: 2011).*

* cited by examiner

*Primary Examiner* — John W Hayes
*Assistant Examiner* — Taylor S Rak
(74) *Attorney, Agent, or Firm* — Schwegman Lundberg & Woessner, P.A.

(57) ABSTRACT

Various examples described herein are directed to systems and methods for processing a payment using a mobile wallet network and issuer. A mobile wallet application provides payment information and an indication if payment may be done directly via the mobile wallet network to a point of sale (POS) terminal. The POS terminal determines which payment network to use. A bill may be sent to the mobile wallet application. The mobile wallet application requests payment authorization from an issuer. The issuer provides the authorization and the transaction is completed between the POS terminal and the mobile wallet application.

16 Claims, 7 Drawing Sheets

MOBILE WALLET 200

| PAYMENT ELEMENT 210 | DIRECT PAYMENT AUTHORIZATION 220 | ISSUER 230 | EXPIRATION DATE 240 |
|---|---|---|---|
| PE1 | YES | BANK1 | 12/2016 |
| PE2 | NO | BANK2 | 10/2019 |
| PE3 | YES | BANK1 | 01/2020 |
| PE4 | YES | BANK2 | 12/2018 |

FIG. 2

DIRECT PAYMENT AUTHORIZATION PATH

TECHNICAL FIELD

Embodiments described herein generally relate to systems and methods for a point-of-sale (POS) system to use direct payment processing between a mobile wallet and an issuer.

BACKGROUND

Mobile wallet applications can allow consumers to make payments for products and services using mobile computing devices instead of cash, credit card accounts, check card, or checks.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which:

FIG. 2 illustrates a payment processing table in a mobile wallet.

DETAILED DESCRIPTION

A user may utilize a mobile wallet application for payment or other transactions from a merchant. The mobile wallet application may interface with a point of sale (POS) system of the merchant to pay for a transaction. Near field communication (NFC) may be used to communicate data between the device that runs the mobile wallet application and the POS system. The POS system may use one of various payment processing networks. Each payment processing network may charge fees to process a payment. The mobile wallet may also be able to process a payment through a payment processing network. The payment processing network that the mobile wallet application uses may be different from any of the payment processing networks available to the POS system. In addition, the payment processing network of the mobile wallet application may charge lower fees than a payment processing network available to the POS system.

When the mobile wallet application provides an indication to submit a payment to the POS system, the mobile wallet application may also provide an indication that the mobile wallet application may also process the payment. The POS system may then determine if the payment should be processed through the mobile wallet application's network or if one of the POS system's networks will be used.

Figure 1:
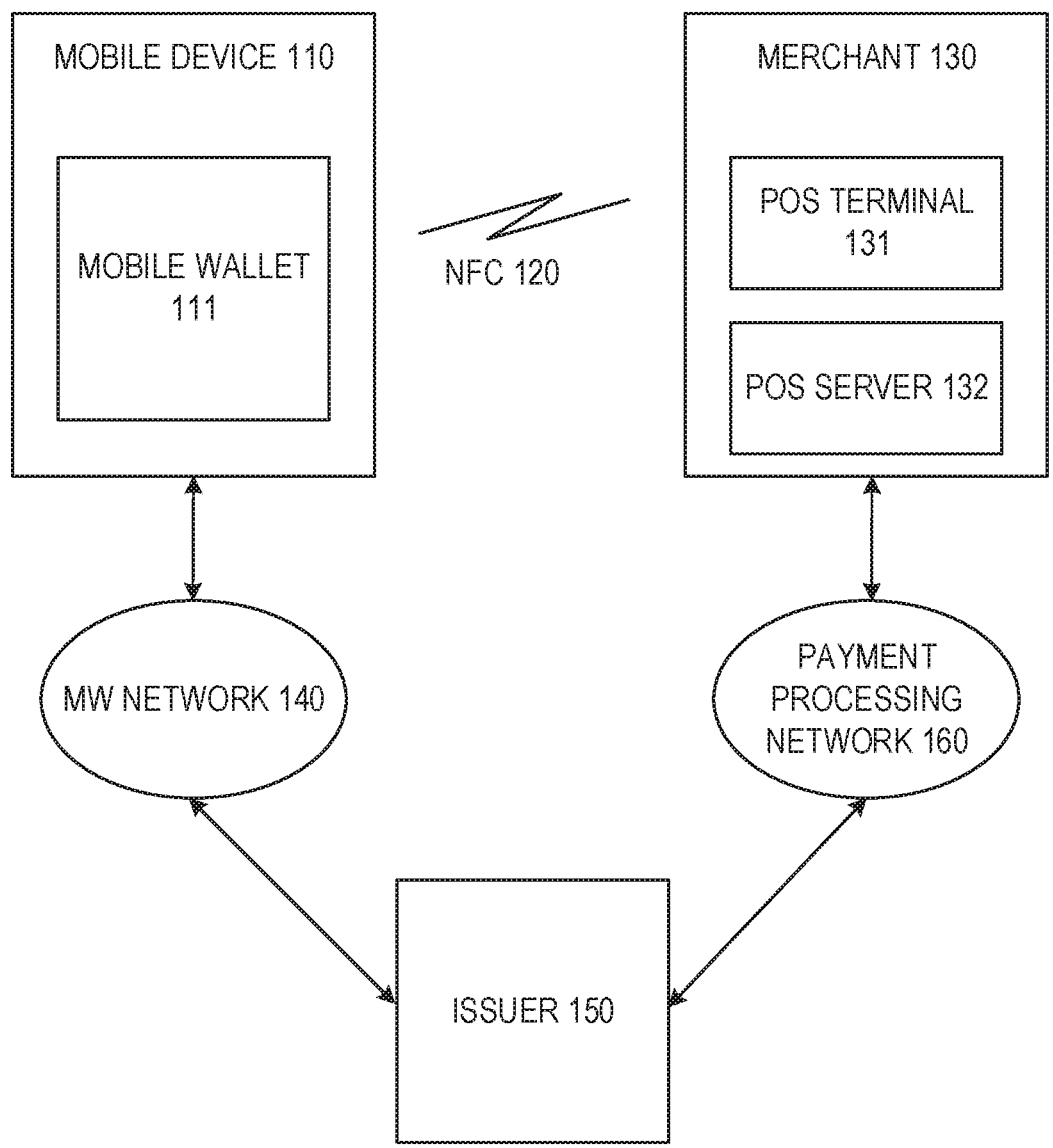
FIG. 1 is a diagram showing one example of a mobile wallet environment.

FIG. 1 is a diagram showing one example of a mobile wallet environment 100. The environment 100 includes a mobile device 110 that has a mobile wallet 111 installed. The mobile wallet 111 is able to run on the mobile device 110. A user may utilize the mobile wallet 111 to pay for purchases. Prior to using the mobile wallet 111 to make payments, the user configures the mobile wallet 111 with the user's account information. The mobile wallet 111 may communicate with an issuer 150 over a mobile wallet network 140 to process transactions, for example. The issuer 150 provides payment abilities to the mobile wallet 111. In an example, the issuer 150 may provide the mobile wallet application 111, e.g., Wells Fargo Wallet®. In another example, the mobile wallet application 111 is provided by an entity other than the issuer 150. In this example, the mobile wallet application 111 communicates with the issuer 150 to process payments. Payment authentication information is provided by the mobile wallet application 111 to the issuer 150 to ensure proper and valid payments.

The environment 100 also includes a merchant 130 with a point of sale (POS) system comprising a POS terminal 131 and POS server 132. The POS system may communicate with the issuer 150 over a payment processing network 160 to process transactions. The payment processing network 160 may be different from the mobile wallet network 140.

The mobile device 110 may be a computing device such as a smartphone, a smart watch, or a tablet computer that includes the mobile wallet 111. The mobile wallet 111 is an application program that is stored in and runs on the mobile device 110. The mobile wallet 111 allows an individual to complete electronic commerce transactions. Electronic commerce transactions may include purchasing items and making payments for those items. Exemplary mobile wallets are Wells Fargo Wallet®, Apple Pay®, Google Wallet®, PayPal®, Samsung Pay®, and the Starbucks App®. The mobile wallet 111 may comprise one or more of payment elements (not shown) and non-payment elements (not shown). Exemplary payment elements include but are not limited to credit card information, debit card information, and bank account information. Exemplary non-payment elements may include passport information, driver's license information, insurance card information, employee card information, a student ID, and member card information.

The user may select a payment element in the mobile wallet 111 in order to pay for a product or service. To pay for items at a merchant, the mobile device 110 may be brought into close vicinity to the POS terminal 131. Close vicinity means the mobile device 110 is close enough to the POS terminal 131 to allow communication between the two devices. For example, the devices may be within a few inches of one another to allow near field communication (NFC) 120. Thus, the devices may communicate invoice and payment information using NFC 120.

The merchant 130 may use the POS system that includes the POS terminal 131 and the POS server 132 to communicate with the mobile wallet 111. The POS terminal 131 is a device typically located at a checkout counter. The POS terminal 131 may scan items, display prices, accept payment such as credit or debit card from a mobile wallet, and print receipts. The POS server 132 is a backend system that may help the merchant to manage business operations including processing financial transactions. In some cases, the POS terminal 131 and POS server 132 are an integrated system or the POS server may exist in the cloud computing platform. In an example, the POS terminal uses a cloud based system where servers are in a remote place and the POS terminal accesses them via the Internet and the merchant may pay subscription fees for using the cloud based virtual POS server. In some examples there are multiple POS terminals at a merchant which are connected to the POS server.

In one type of transaction process (similar to existing technology), when the mobile wallet 111 submits a payment element such as credit card over the NFC 120 network to the POS terminal 131, the POS terminal 131 transfers the payment to the POS server 132. The POS server 132 may submit the payment to the payment processing network 160 to get a payment authorization and clear the payment with the issuer 150. Using the payment network 160 may cost the merchant 130 various fees. The merchant 130 may receive payment equal to the payment minus the network fees. The payment processing network 160 may include multiple entities such as a processor, an acquirer, a credit/debit card company, and other components. In some cases, there may be multiple networks with different fees in the payment processing network 160. The POS server 132 may choose an appropriate payment processing network depending on the payment.

In another type of transaction process, the mobile wallet (MW) network 140 may provide a direct communication path between the mobile wallet 110 and the issuer 150. The mobile wallet application 111 may include features such as direct communication between the mobile wallet application 111 and the issuer 150. In an example, the mobile wallet application 111 may use wallet-to-wallet (W2W) communication to communicate directly with the issuer 150. The direct communication over the MW network 140 may remove the payment processing fees incurred by the processing entities or provide lower fees to the merchant 130. In some cases, there may exist a separate mobile wallet provider such as Google Wallet® and Apply Pay® which is different from the issuer 150. In this example, the mobile wallet provider bridges the direct communication between the mobile wallet application 111 and the issuer 150.

The mobile wallet 111 may have multiple payment elements. The mobile wallet 111 may be able to communicate directly with some issuers of a payment element and may not be able communicate with other issuers of other payment elements directly via the mobile wallet network 140. In addition, even though mobile wallets may communicate with issuers directly, some issuers may not offer processing payment authorization. For one or more, or all, payment elements, the mobile wallet application 111 may store data indicating whether the payment element is able to communicate directly to the issuer.

FIG. 2 illustrates an example of a payment processing table 200 in a mobile wallet application. The payment processing table 200 includes data indicating whether a payment element may communicate directly with its issuer. The payment process table 200 may be stored in non-volatile memory that is accessible to the mobile wallet application. The table include the payment element 210 column that includes a set of elements PE1, PE2, PE3, and PE4. For each payment element 210, a direct payment authorization 220 column indicates if the payment element is able to process payments directly with the issuer. An issuer 230 column indicates the name of the issuer and an expiration date 240 column indicates when the payment element expires. In addition, the table 200 may include data such as the address of the interface of the issuer that is used to process payments. The data may be stored in other formats that allow the mobile wallet application to access the stored data. For example, the data may be stored in a text file, a database, in a structured file, etc. In an example, the issuers allow direct communication may specify fees of using it to get payment authorization directly and the fees may be lower than the fees to pay to the payment processing network.

When a mobile wallet 111 submits a payment element to a POS terminal 131, the mobile wallet 111 may use the table 200 to determine if the payment element can be processed directly with the issuer. An indication that direct payment is available may be communicated from them mobile wallet 111 to the POS terminal 131. The POS system may determine if the POS system should use the direct MW network 140 or the payment processing network 160.

In an example, the POS system may select the processing network based upon the fees associated with using the network. The mobile wallet 111 may provide information regarding fees of the MW network 140 to the POS system when a payment is submitted. The POS system may determine if the MW network 140 has lower fees compared to the other payment process networks available to the POS system. The POS system may also determine if savings by using the MW network are more than a threshold amount before selecting to use the MW network.

The POS system may provide an incentive to a user to use a direct payment method. For example, the POS system may provide a discount based upon the lower fees of the MW payment network. In an example, the POS system may reduce the amount of a bill by an amount equal to a percentage of the savings, e.g., 10%, 25%, 50%, etc., associated with using the MW network 140 instead of another payment processing network 160.

Figure 3:
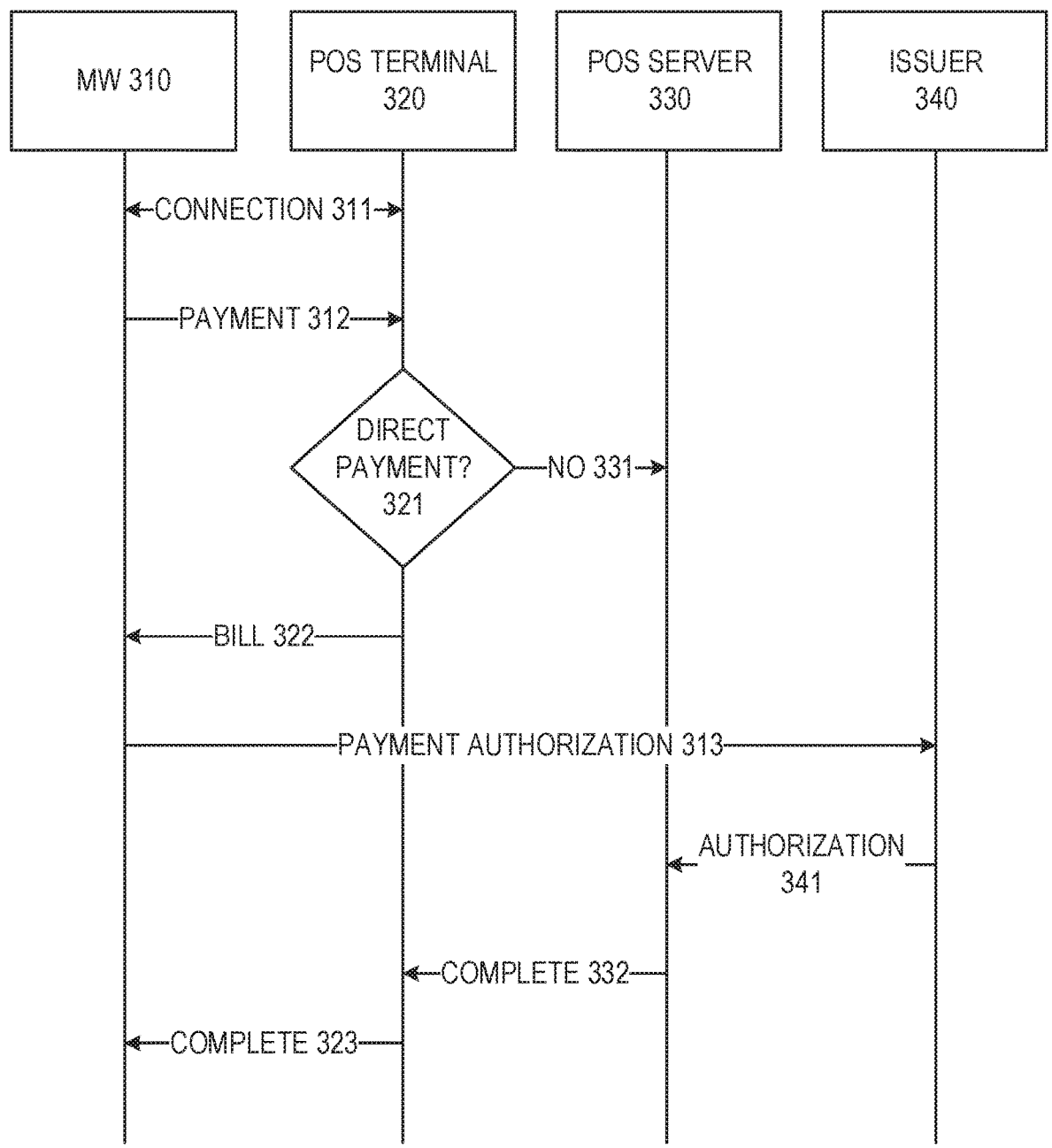
FIG. 3 is a timing diagram showing one example for processing a payment using the mobile wallet.

FIG. 3 is a timing diagram showing one example for processing a payment using the mobile wallet. A mobile wallet (MW) 310 and a POS terminal 320 may establish communication between them over a NFC interface 311 by using standard protocols such as ECMA-340 and ISO/IEC 18092 when a mobile device is placed near the POS terminal.

Once the NFC connection is established, the POS terminal 320 may provide the MW 310 with an indication that payment is requested. For example, an indication may be received and the MW 310 may be automatically launched. The MW 310 may provide a list of available payment elements that may be used to pay for a purchase. Once a payment element is selected, the MW 310 may provide an indication to the POS system 320 to pay the invoice using the selected payment element 312. In addition, the MW may provide additional information regarding if direct payment processing is available for the selected payment element.

The MW 310 may submit a payment element selected by the buyer to the POS terminal 320 (as shown at 312). For example, the MW 310 may determine if direct payment processing is available. In an example, the table 200 may be used to determine if direct payment processing is available for a selected payment element. In addition, the MW 310 may provide an indication to a user as to which payments elements may be directly processed. In an example, the MW 310 may also provide information such as fees to process a payment directly to the POS system. The POS system may provide the MW 310 with an indication of incentives for the various payment elements available to the MW 310 based upon receiving the fees from the MW 310. For example, the MW 310 may provide the POS system with information regarding each payment element available to the MW 310 that can process payments directly. In addition, providing the fees to the POS system allows the POS system to determine which payment elements would be selected to process the payments directly. In addition, the POS system may determine incentives, such as discounts from the invoice amount, that will be applied to the purchase if a particular payment element is selected. The incentives may then be displayed along with the corresponding payment element.

The POS terminal 320 may determine if the payment should be processed by the MW network 140 or the payment processing network 160 (as shown at 321). There may be more than one payment processing networks available to the POS system. The POS terminal may determine which network is cheapest to use. The payment may then be processed using the selected network.

In an example, the POS terminal 320 may determine to use one of the payment processing networks available to the POS system. In this case, the POS terminal may send the payment to a POS server 330 to process the payment as shown at 331. In another example, the POS terminal 320 may send an invoice or bill to the MW 310 to process payment of the invoice as shown at 322.

Once the MW 310 receives the invoice, the MW 310 may communicate with an issuer 230 as shown in 340. The MW 310 may communicate with the issuer 230 over a MW network. The MW 310 may request payment authorization and provide information about the merchant to the issuer 313. For example, the address of the POS server 330 and how the POS server 330 may be contacted may be provided to the issuer 340. In addition, a merchant identifier may be provided such as a unique ID known to the industry, a web address, a W2W communication address, etc.

Upon receiving a request for payment authorization, the issuer 340 may verify the account associated with the selected payment element and issue a payment authorization to the POS server 330 (as shown at 341). The information provided by the MW 310 may be used to connect to and communicate with the POS server 330. The POS server 330 informs the POS terminal that the transaction is complete at 332. The POS server 330 may provide a transaction identifier that identifies the transaction that has been completed. The POS terminal 320 may then provide an indication to the MW 310 that the transaction has completed successfully 323. The POS terminal 320 may use the transaction identifier to determine which MW 310 corresponds with the completed transaction.

In an example, the MW network may be used for the issuer to communicate with the POS system via the MW 310. For example, the issuer 340 may send the payment authorization to the MW 310 rather than the POS server 330. The MW 310 may then send the authorization to the POS server 330 via the POS terminal 320. In this example, the authenticity of the payment authorization may be ensured using certificates. For example, the issuer 340 may use a public key associated with the merchant or the POS server 330 to encrypt the payment authorization. The POS system may then decrypt the payment authorization using the corresponding private key.

Figure 4:
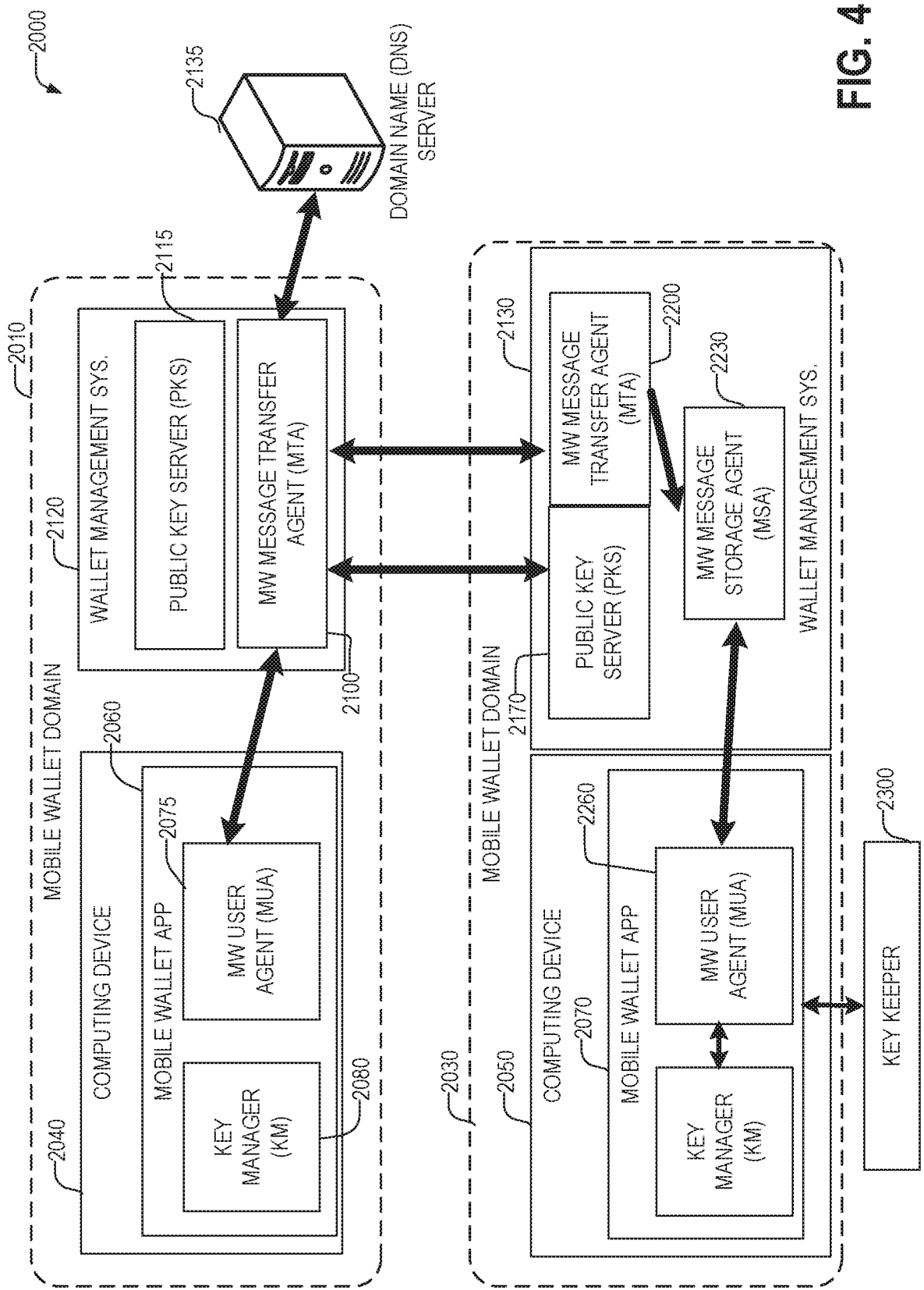
FIG. 4 is a diagram showing one example of a mobile wallet application to mobile wallet application secure digital communication.

FIG. 4 is a diagram showing one example of a mobile wallet application to mobile wallet application secure digital communication. A first mobile wallet application 2060 executing on a computing device 2040 in a first mobile wallet domain 2010 is sending a message to a second mobile wallet application 2070 executing on a second computing device 2050 in a second mobile wallet domain 2030. In an example, one of the mobile wallet domains may be the issuer and/or the mobile wallet service provider. Mobile wallet application 2060 may include a mobile wallet user agent (MUA) 2075 and a key manager 2080. The MUA 2075 allows users to compose, send and retrieve mobile wallet (MW) messages. Key manager 2080 may one or more of: create, provision, register, store, and manage one or more cryptographic keys. Key manager 2080 may register (or obtain) a public key with a certificate authority (not shown for clarity) and with a PKS 2115.

A mobile wallet application 2060 may provide one or more graphical user interfaces (GUI)s to allow users to compose and edit one or more mobile wallet messages. Before sending a message, the MUA 2075 requests the recipient's public key from the MTA 2100. The PKS 2115 and MTA 2100 may be provided by the mobile wallet management system 2120 of the mobile wallet domain 2010. The PKS 2115 and MTA 2100 may be provided by the same computing device, or different computing devices. While the PKS 2115 and MTA 2100 are shown as part of the mobile wallet management system 2120, they may be provided by separate entities. The MTA and PKS are accessible to computing device 2040 and other computing devices both within the mobile wallet domain 2010 and other devices within other mobile wallet domains, over one or more networks (not shown for clarity). These networks may include one or more portions of: Local Area Networks (LAN), Wide Area Networks (WAN), Metropolitan Area Networks (MAN), the Internet, cellular networks, and the like.

The MTA 2100 first examines the message to determine which mobile wallet domain the recipient is in. If the mobile wallet domain is mobile wallet domain 2010, the MTA may retrieve the public key from the PKS 2115 of mobile wallet domain 2010. If the mobile wallet domain is in another domain, then the MTA checks its DNS cache to determine if it already knows the IP address of the recipient mobile wallet domain's PKS. If the mobile wallet domain is not in the DNS cache, the MW sends a lookup message to DNS server 2135 using the Domain Name System Protocol. DNS server 2135 responds with an IP address of the mobile wallet domain (or an error). Once the address is determined (either through the cache or the DNS server 2135), the MTA 2100 sends a message to a PKS 2170 asking for the public key of the recipient mobile wallet application (e.g., mobile wallet application 2070). The response includes the recipient's public key. The public key is then passed by the MTA 2100 to the MUA 2075.

In some examples, the public key is passed to the MTA 2100 in the form of a digital certificate issued by a Certificate Authority (CA). A digital certificate typically includes the name and other identification information of the holder, the holder's public key, the name of the CA, a serial number, and a validity period. The information in the digital certificate is signed by the issuing CA using the issuing CA's private key. The signature can be verified using the CA's public key (which is known and may be pre-installed on the computing devices 2040, 2050). This may serve as a means to verify that the public key is owned by the recipient. For example, the PKS 2170 may provide a digital certificate created by a trusted CA for the recipient mobile wallet application 2070 in response to the request for the recipient's public key. MUA 2075 (or MTA 2100) may utilize the CA's public key and decrypt the certificate. The certificate may then be checked to determine that the message was not tampered with, and that the public key therein belongs to the mobile wallet application 2070 (e.g., authentication and verification).

Once the MUA 2075 is satisfied with the public key, the MUA 2075 then encrypts the contents of the message with the received public key and sends it to the MTA 2100. The MTA 2100 determines the IP Address of the recipient mobile wallet domain's MTA 2200. In some examples, the MTA 2100 utilizes the IP Address previously determined from the DNS server (e.g., using the cache) when retrieving the public key of the recipient. For example, the PKS 2170 and MTA 2200 may have the same IP Address, or the IP Address of the MTA 2200 may be derivable from the IP Address of the PKS 2170. In other examples a mobile wallet application in mobile wallet domain 2010 may have previously communicated with a mobile wallet application in mobile wallet domain 2030 (and thus the MTA 2100 still has the IP Address in its cache). In other examples, the MTA 2100 may re-request the IP Address from the DNS server 2135.

The MTA 2100 then sends the message 2190 to the MTA 2200 of the mobile wallet management system 2130 of the recipient mobile wallet domain 2030 using the determined IP address. MTA 2200 may send a response to MTA 2100 (which may be forwarded to MUA—but this message is not shown for clarity). MTA 2200 may then send the message to the mobile wallet message storage agent (MSA) 2230. Note that the mobile wallet management system 2120 may also employ a MSA, but it is not shown for clarity. MSA 2230 may then store the message and alert the MUA 2260 of the recipient mobile wallet application 2070 using a notification. When the MUA is interested in receiving the message, the MUA may request it and the MSA may provide it. The MUA may decrypt the message using its private key. The private key may be maintained in the key manager 2290. Key manager 2290 may communicate with key keeper 2300. Key keeper 2300 may be a remote key storage facility to prevent the loss of the cryptographic keys should the computing device 2050 experience a loss in data. For example, the key manager 2290 may store one or more keys of the mobile wallet application 2070 in the key keeper 2300.

In some examples, the mobile wallet application 2070 may utilize a second cryptographic key to encrypt the private key. The private key may then be stored with the mobile wallet management system 2130 in encrypted form. The second cryptographic key may then be stored with the key keeper 2300 and utilized to decrypt the private key should the computing device 2050 need it. The key keeper 2300 may be under control of the user of computing device 2050. This ensures that the private key is not given to the mobile wallet management system 2130 and thus the user can entrust that no one associated with the mobile wallet management system 2130 can access their messages.

Figure 5:
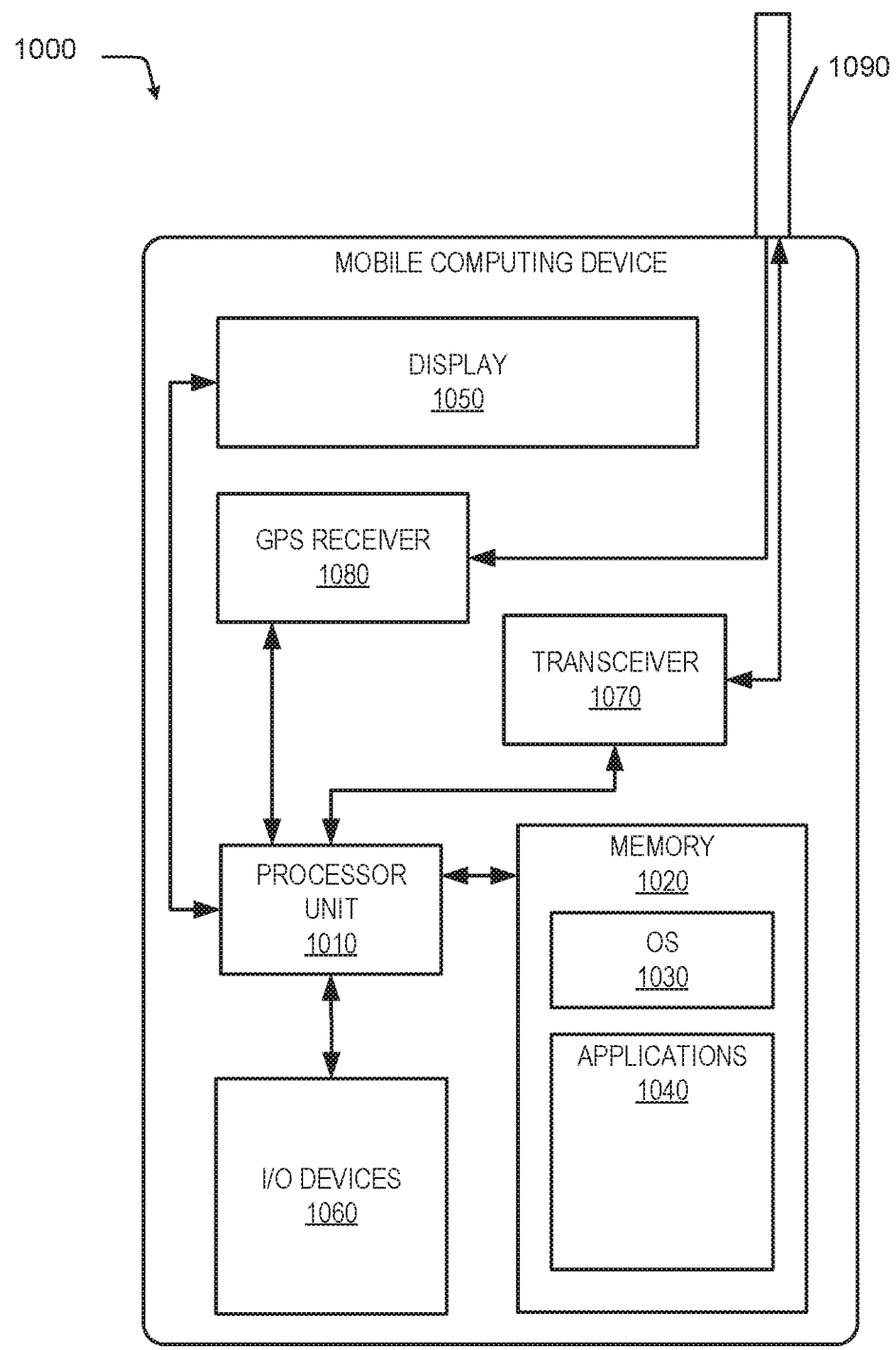
FIG. 5 is a block diagram showing an example architecture of a mobile computing device.

FIG. 5 is a block diagram showing an example architecture 1000 of a mobile computing device. For example, the architecture 1000, for example, may describe any of the computing devices described. The architecture 1000 comprises a processor unit 1014. The processor unit 1014 may include one or more processors. Any of a variety of different types of commercially available processors suitable for mobile computing devices may be used (for example, an XScale architecture microprocessor, a Microprocessor without Interlocked Pipeline Stages (MIPS) architecture processor, or another type of processor). A memory 1020, such as a Random Access Memory (RAM), a Flash memory, or other type of memory or data storage, is typically accessible to the processor. The memory 1020 may be adapted to store an operating system (OS) 1030, as well as application programs 1040. In some examples, the OS may implement software interrupts that cause the architecture 1120 to pause its current task and execute an interrupt service routine (ISR) when an interrupt is received.

The processor unit 1010 may be coupled, either directly or via appropriate intermediary hardware, to a display 1050 and to one or more input/output (I/O) devices 1060, such as a keypad, a touch panel sensor, a microphone, and the like. Such I/O devices 1060 may include a touch sensor for capturing fingerprint data, a camera for capturing one or more images of the user, a retinal scanner, or any other suitable devices. Similarly, in some examples, the processor unit 1010 may be coupled to a transceiver 1070 that interfaces with an antenna 1090. The transceiver 1070 may be configured to both transmit and receive cellular network signals, wireless data signals, or other types of signals via the antenna 1090, depending on the nature of the mobile computing device implemented by the architecture 1100. Although one transceiver 1070 is shown, in some examples, the architecture 1100 includes additional transceivers. For example, a wireless transceiver may be utilized to communicate according to an IEEE 802.11 specification, such as Wi-Fi and/or to a short range communication medium. Some short range communication mediums, such as NFC, may utilize a separate, dedicated transceiver. Further, in some configurations, a GPS receiver 1080 may also make use of the antenna 1090 to receive GPS signals. In addition to or instead of the GPS receiver 1080, any suitable location-determining sensor may be included and/or used including, for example, a Wi-Fi positioning system. In some examples, the architecture (e.g., processor unit 1010) may also support a hardware interrupt. In response to a hardware interrupt, the processor unit 1010 may pause its processing and execute an interrupt service routine (ISR). For example, the alert message 116 may include and/or trigger a hardware interrupt. The ISR for the hardware interrupt may generate the alert, for example, as described herein.

Figure 6:
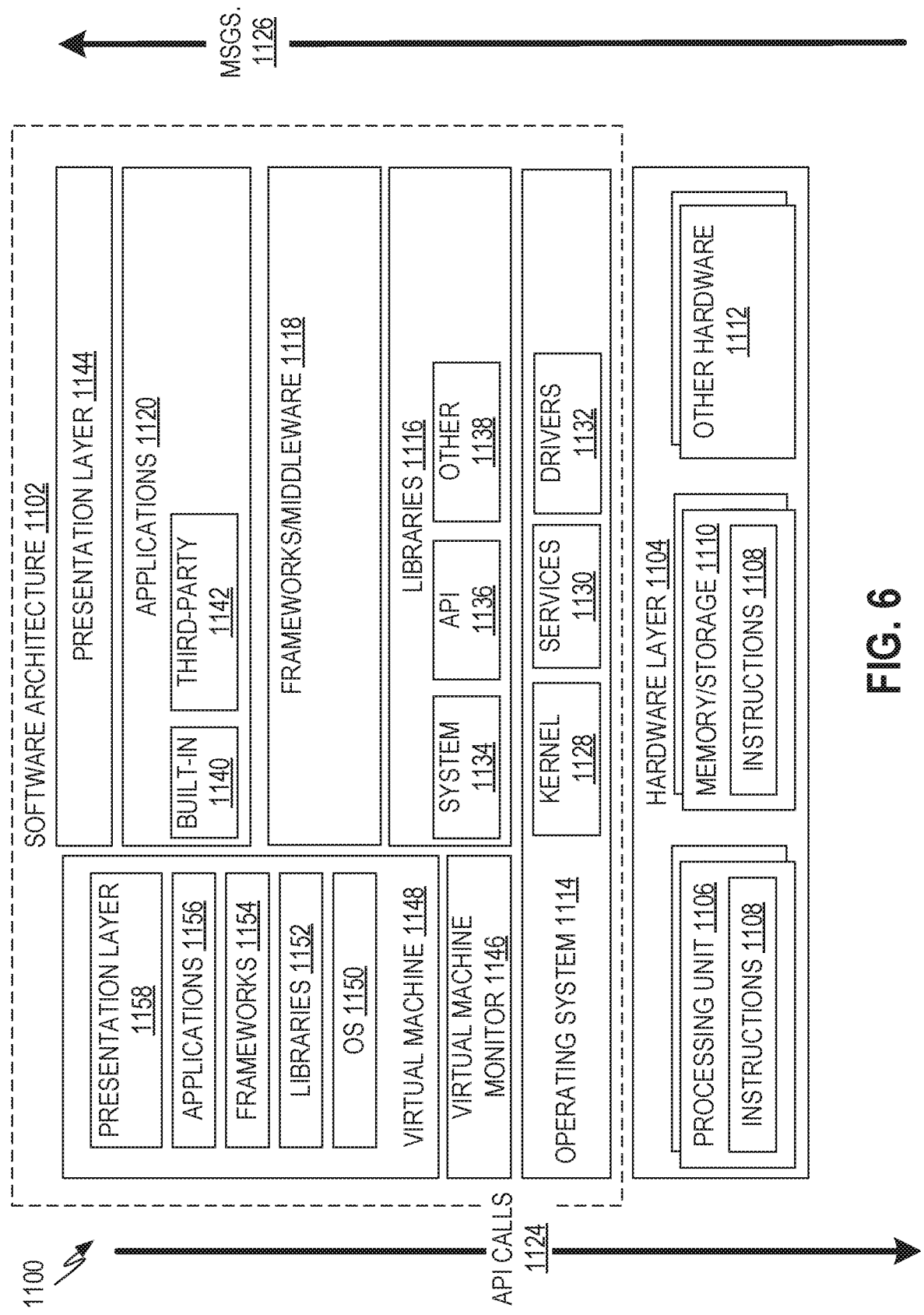
FIG. 6 is a block diagram showing one example of a software architecture for a computing device.
Figure 7:
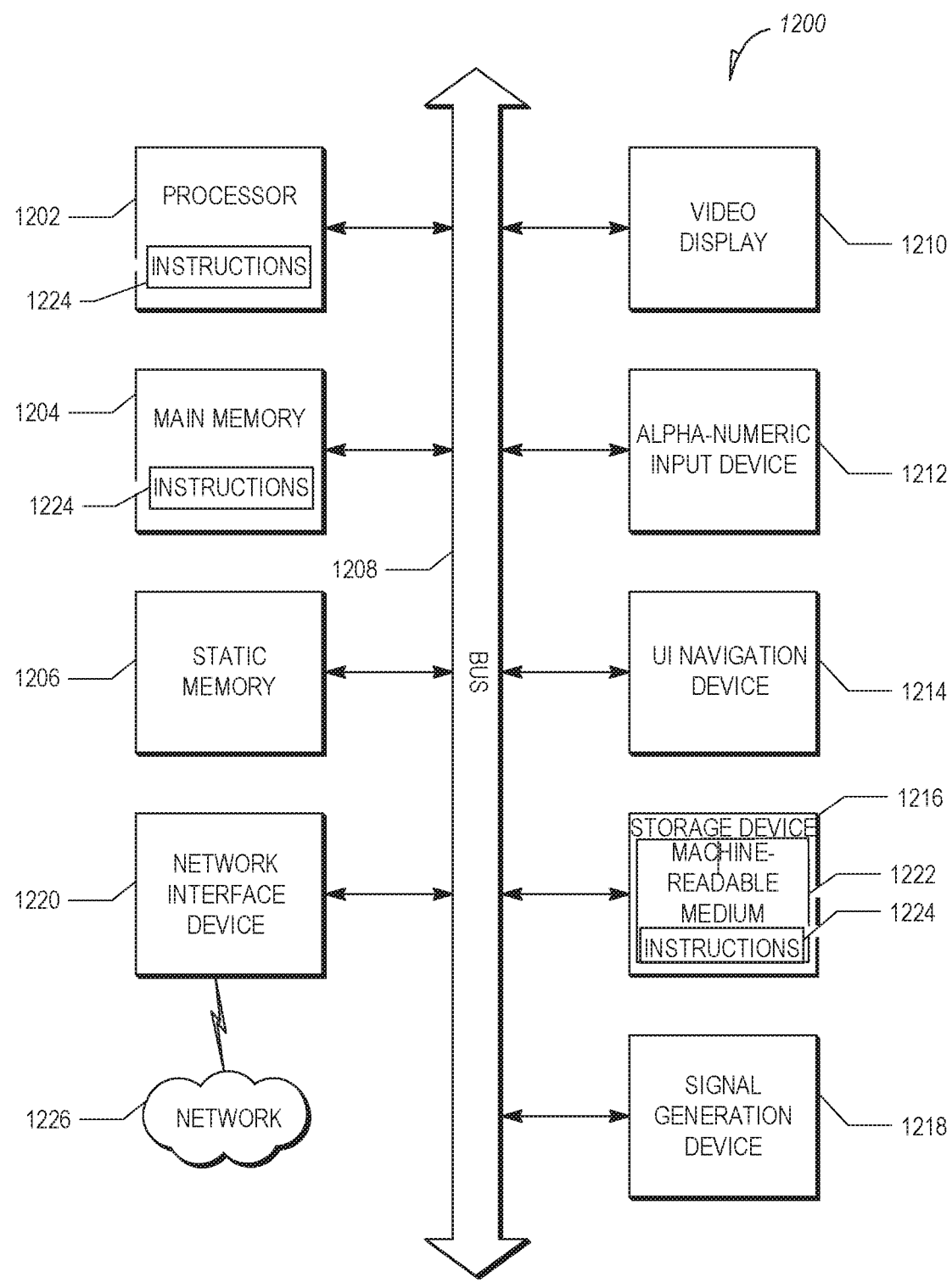
FIG. 7 is a block diagram illustrating a computing device hardware architecture, within which a set or sequence of instructions can be executed to cause the hardware to perform examples of any one of the methodologies discussed herein.

FIG. 6 is a block diagram 1100 showing one example of a software architecture 1102 for a computing device. The architecture 1102 may be used in conjunction with various hardware architectures, for example, as described herein. FIG. 6 is merely a non-limiting example of a software architecture 1102 and many other architectures may be implemented to facilitate the functionality described herein. A representative hardware layer 1104 is illustrated and can represent, for example, any of the above referenced computing devices. In some examples, the hardware layer 1104 may be implemented according to the architecture 1102 of FIG. 11 and/or the architecture 1000 of FIG. 5.

The representative hardware layer 1104 comprises one or more processing units 1106 having associated executable instructions 1108. Executable instructions 1108 represent the executable instructions of the software architecture 1102, including implementation of the methods, modules, components, and so forth of FIGS. 1-3. Hardware layer 1104 also includes memory and/or storage modules 1110, which also have executable instructions 1108. Hardware layer 1104 may also comprise other hardware as indicated by other hardware 1112 which represents any other hardware of the hardware layer 1104, such as the other hardware illustrated as part of hardware architecture 1200.

In the example architecture of FIG. 11, the software 1102 may be conceptualized as a stack of layers where each layer provides particular functionality. For example, the software 1102 may include layers such as an operating system 1114, libraries 1116, frameworks/middleware 1118, applications 1120 and presentation layer 1144. Operationally, the applications 1120 and/or other components within the layers may invoke application programming interface (API) calls 1124 through the software stack and receive a response, returned values, and so forth illustrated as messages 1126 in response to the API calls 1124. The layers illustrated are representative in nature and not all software architectures have all layers. For example, some mobile or special purpose operating systems may not provide a frameworks/middleware layer 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. In some examples, the services 1130 include an interrupt service. The interrupt service may detect the receipt of a hardware or software interrupt and, in response, cause the architecture 1102 to pause its current processing and execute an interrupt service routine (ISR) when an interrupt is received. The ISR may generate the alert, for example, as described herein.

The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than to interface directly with the underlying operating system 1114 functionality (e.g., kernel 1128, services 1130 and/or drivers 1132). The libraries 1116 may include system 1134 libraries (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 9D in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks 1118 (also sometimes referred to as middleware) may provide a higher-level common infrastructure that may be utilized by the applications 1120 and/or other software components/modules. For example, the frameworks 1118 may provide various graphic user interface (GUI) functions, high-level resource management, high-level location services, and so forth. The frameworks 1118 may provide a broad spectrum of other APIs that may be utilized by the applications 1120 and/or other software components/modules, some of which may be specific to a particular operating system or platform.

The applications 1120 includes built-in applications 1140 and/or third party applications 1142. Examples of representative built-in applications 1140 may include, but are not limited to, a contacts application, a browser application, a book reader application, a location application, a media application, a messaging application, and/or a game application. Third party applications 1142 may include any of the built in applications as well as a broad assortment of other applications. In a specific example, the third party application 1142 (e.g., an application developed using the Android™ or iOS™ software development kit (SDK) by an entity other than the vendor of the particular platform) may be mobile software running on a mobile operating system such as iOS™ Android™, Windows® Phone, or other mobile computing device operating systems. In this example, the third party application 1142 may invoke the API calls 1124 provided by the mobile operating system such as operating system 1114 to facilitate functionality described herein.

The applications 1120 may utilize built in operating system functions (e.g., kernel 1128, services 1130 and/or drivers 1132), libraries (e.g., system 1134, APIs 1136, and other libraries 1138), frameworks/middleware 1118 to create user interfaces to interact with users of the system. Alternatively, or additionally, in some systems interactions with a user may occur through a presentation layer, such as presentation layer 1144. In these systems, the application/module "logic" can be separated from the aspects of the application/module that interact with a user.

Some software architectures utilize virtual machines. For example, systems described herein may be executed utilizing one or more virtual machines executed at one or more server computing machines. In the example of FIG. 11, this is illustrated by virtual machine 1148. A virtual machine creates a software environment where applications/modules can execute as if they were executing on a hardware computing device. A virtual machine is hosted by a host operating system (operating system 1114) and typically, although not always, has a virtual machine monitor 1146, which manages the operation of the virtual machine as well as the interface with the host operating system (i.e., operating system 1114). A software architecture executes within the virtual machine such as an operating system 1150, libraries 1152, frameworks/middleware 1154, applications 1156 and/or presentation layer 1158. These layers of software architecture executing within the virtual machine 1148 can be the same as corresponding layers previously described or may be different.

FIG. 12 is a block diagram illustrating a computing device hardware architecture 1200, within which a set or sequence of instructions can be executed to cause the machine to perform examples of any one of the methodologies discussed herein. For example, the architecture 1200 may execute the software architecture 1102 described with respect to FIG. 11. The architecture 1200 may operate as a standalone device or may be connected (e.g., networked) to other machines. In a networked deployment, the architecture 1200 may operate in the capacity of either a server or a client machine in server-client network environments, or it may act as a peer machine in peer-to-peer (or distributed) network environments. The architecture 1200 can be implemented in a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify operations to be taken by that machine.

Example architecture 1200 includes a processor unit 1202 comprising at least one processor (e.g., a central processing unit (CPU), a graphics processing unit (GPU) or both, processor cores, compute nodes, etc.). The architecture 1200 may further comprise a main memory 1204 and a static memory 1206, which communicate with each other via a link 1208 (e.g., bus). The architecture 1200 can further include a video display unit 1210, an alphanumeric input device 1212 (e.g., a keyboard), and a user interface (UI) navigation device 1214 (e.g., a mouse). In some examples, the video display unit 1210, input device 1212 and UI navigation device 1214 are incorporated into a touch screen display. The architecture 1200 may additionally include a storage device 1216 (e.g., a drive unit), a signal generation device 1218 (e.g., a speaker), a network interface device 1220, and one or more sensors (not shown), such as a global positioning system (GPS) sensor, compass, accelerometer, or other sensor.

In some examples, the processor unit 1202 or other suitable hardware component may support a hardware interrupt. In response to a hardware interrupt, the processor unit 1202 may pause its processing and execute an interrupt service routine (ISR), for example, as described herein.

The storage device 1216 includes a machine-readable medium 1222 on which is stored one or more sets of data structures and instructions 1224 (e.g., software) embodying or utilized by any one or more of the methodologies or functions described herein. The instructions 1224 can also reside, completely or at least partially, within the main memory 1204, static memory 1206, and/or within the processor 1202 during execution thereof by the architecture 1200, with the main memory 1204, static memory 1206, and the processor 1202 also constituting machine-readable media. Instructions stored at the machine-readable medium 1222 may include, for example, instructions for implementing the software architecture 1102, instructions for executing any of the features described herein, etc.

While the machine-readable medium 1222 is illustrated in an example to be a single medium, the term "machine-readable medium" can include a single medium or multiple media (e.g., a centralized or distributed database, and/or associated caches and servers) that store the one or more instructions 1224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1224 can further be transmitted or received over a communications network 1226 using a transmission medium via the network interface device 1220 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A mobile computing device comprising:
   at least one processor unit:
   and a memory in communication with the at least one processor unit, the memory including instructions that, when executed by the at least one processor unit, cause the at least one processor unit to perform operations comprising:
   establishing, via a first network connection, communication between the mobile computing device and a point of sale (POS) terminal:
   displaying a plurality of payment elements associated with a mobile wallet;
   storing payment element information for each of the plurality of payment elements, wherein the payment element information includes direct payment authorization information;
   submitting, via the first network connection, the plurality of payment elements and an indication that at least one of the plurality of payment elements allows direct payment authorization to the POS terminal;
   providing to the POS terminal, fees associated with directly processing, via a mobile wallet network, a payment;
   receiving, via the first network connection, a discount on a direct payment associated with the at least one payment element that allows direct payment authorization from the POS terminal;
   presenting the discount;
   receiving a selection of the payment element associated with the discount from the plurality of payment elements;

determining that the selected payment element includes an indication of an ability to process an invoice directly by an issuer of the selected payment element;

receiving, via the first network connection, an invoice for a purchase from the POS terminal;

establishing, via the mobile wallet network, a second network connection with a computing device associated with an issuer;

requesting, from the computing device associated with the issuer, and via the mobile wallet network over the second network connection, payment authorization of the invoice based on the selection; and receiving, over the first network connection, a transaction complete indication associated with the invoice from the POS terminal.

2. The computing device of claim 1, wherein the first network connection is a near field communication network connection.

3. The computing device of claim 1, the operations further comprising:

receiving, via the mobile wallet network, a payment authorization from the issuer; and sending the payment authorization to the POS terminal.

4. The computing device of claim 3, the operations further comprising encrypting the payment authorization with a public key associated with the POS terminal.

5. The computing device of claim 1, the operations further comprising providing the POS terminal with fee information associated with processing a payment with the issuer.

6. The computing device of claim 5, the operations further comprising reducing an amount of the invoice based upon the fee information associated with processing a payment with the issuer.

7. The computing device of claim 1, the operations further comprising:

determining that a payment element of the plurality of payment elements is capable of being processed directly based on the direct payment authorization information; and displaying an indication that the payment element is able to be directly processed based on the determination.

8. A method for executing a mobile wallet element at a mobile computing device, the method comprising:

establishing, by the mobile wallet element and via a first network connection, communication between the mobile computing device and a point of sale (POS) terminal;

displaying, by the mobile wallet element, a plurality of payment elements associated with a mobile wallet;

storing, by the mobile wallet element, payment element information for each of the plurality of payment elements, the payment element information including direct payment authorization information;

submitting, by the mobile wallet element, using the first network connection, the plurality of payment elements and an indication that at least one of the plurality of payment elements allows direct payment authorization to the POS terminal;

providing, by the mobile wallet element, to the POS terminal, fees associated with directly processing via a mobile wallet network, a payment;

receiving, by the mobile wallet element, via the first network connection, a discount on a direct payment associated with the at least one payment element that allows direct payment authorization from the POS terminal;

presenting, by the mobile wallet element, the discount;

receiving, by the mobile wallet element, a selection of the payment element associated with the discount from the plurality of payment elements;

determining, by the mobile wallet element, that the selected payment element includes an indication of an ability to process an invoice directly by an issuer of the selected payment element;

receiving, by the mobile wallet element and via the first network connection, an invoice for a purchase from the POS terminal;

establishing, by the mobile wallet element and via the mobile wallet network, a second network connection with a computing device associated with an issuer;

requesting, by the mobile wallet element, from the computing device associated with the issuer, and via the mobile wallet network over the second network connection, payment authorization of the invoice based on the selection; and receiving, by the mobile wallet element, over the first network connection, a transaction complete indication associated with the invoice from the POS terminal.

9. The method of claim 8, wherein the first network connection is a near field communication network connection.

10. The method of claim 8, further comprising:

receiving, by the mobile wallet element and via the mobile wallet network, a payment authorization from the issuer; and sending, by the mobile wallet element, the payment authorization to the POS terminal.

11. The method of claim 8, further comprising providing, by the mobile wallet element, the POS terminal with fee information associated with processing a payment with the issuer.

12. The method of claim 11, further comprising:

determining, by the mobile wallet element, that a payment element of the plurality of payment elements is capable of being processed directly based on the direct payment authorization information; and displaying, by the mobile wallet element an indication that the payment element is able to be directly processed based on the determination.

13. A non-transitory machine-readable medium comprising instructions thereon that, when executed by at least one processor unit of a mobile computing device, causes the at least one processor unit to perform operations comprising:

establishing, via a first network connection, communication between the mobile computing device and a point of sale (POS) terminal;

displaying a plurality of payment elements associated with a mobile wallet;

storing payment element information for each of the plurality of payment elements, the payment element information including direct payment authorization information;

submitting, using the first network connection, the plurality of payment elements and an indication that at least one of the plurality of payment elements allows direct payment authorization to the POS terminal;

providing to the POS terminal, fees associated with directly processing, via a mobile wallet network, a payment;

receiving, via the first network connection, a discount on a direct payment associated with the at least one payment element that allows direct payment authorization from the POS terminal;

presenting the discount;

receiving a selection of the payment element associated with the discount from the plurality of payment elements;

determining that the selected payment element includes an indication of an ability to process an invoice directly by an issuer of the selected payment element;

receiving, via the first network connection, an invoice for a purchase from the POS terminal;

establishing, via the mobile wallet network, a second network connection with a computing device associated with an issuer;

requesting, from the computing device associated with the issuer, and via the mobile wallet network over the second network connection, payment authorization of the invoice based on the selection; and receiving, over the first network connection, a transaction complete indication associated with the invoice from the POS terminal.

14. The non-transitory machine-readable medium of claim 13, the operations further comprising sending a shipping address to a merchant application.

15. The non-transitory machine-readable medium of claim 13, the operations further comprising receiving a tracking number from a merchant application.

16. The non-transitory machine-readable medium of claim 13, the operations further comprising:

receiving, via the mobile wallet network, a payment authorization from the issuer; and sending the payment authorization to the POS terminal.

* * * * *

UNITED STATES PATENT AND TRADEMARK OFFICE
CERTIFICATE OF CORRECTION

| | | |
|---|---|---|
| PATENT NO. | : 11,080,685 B1 | Page 1 of 1 |
| APPLICATION NO. | : 15/620562 | |
| DATED | : August 3, 2021 | |
| INVENTOR(S) | : Joon Maeng | |

It is certified that error appears in the above-identified patent and that said Letters Patent is hereby corrected as shown below:

On the Title Page

Item (73), in "Assignee", in Column 1, Line 1, delete "Weils Fargo Bank, N.A.," and insert --Wells Fargo Bank, N.A.,-- therefor In the Claims In Column 12, Line 46, in Claim 12, delete "terminal:" and insert --terminal;-- therefor Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*